United States Patent [19]

Motoyama

[11] Patent Number: 5,412,779
[45] Date of Patent: May 2, 1995

[54] METHOD AND APPARATUS FOR CONTROLLING AND COMMUNICATING WITH BUSINESS OFFICE DEVICES

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 282,168

[22] Filed: Jul. 28, 1994

Related U.S. Application Data

[63] Continuation of Ser. No. 902,462, Jun. 19, 1992, abandoned, which is a continuation of Ser. No. 549,278, Jul. 6, 1990, abandoned.

[51] Int. Cl.6 .............................................. G06F 3/00
[52] U.S. Cl. .................................. 395/275; 395/200; 395/325; 355/203; 358/442
[58] Field of Search ...................... 395/325, 200, 275; 358/442; 371/11.4, 14, 29.1; 355/203, 204, 205, 206

[56] References Cited

U.S. PATENT DOCUMENTS

| | | | |
|---|---|---|---|
| 4,084,680 | 4/1978 | Deetz | 400/62 |
| 4,106,092 | 8/1978 | Millers, II | 364/200 |
| 4,162,520 | 7/1979 | Cook et al. | 364/200 |
| 4,218,740 | 8/1980 | Bennett et al. | 395/250 |
| 4,298,928 | 11/1981 | Etoh et al. | 395/325 |
| 4,368,512 | 1/1983 | Kyu et al. | 395/325 |
| 4,370,730 | 1/1983 | Chadra | 364/900 |
| 4,371,950 | 2/1983 | Chadra | 364/900 |
| 4,386,415 | 5/1983 | Chadra | 364/900 |
| 4,415,986 | 11/1983 | Chadra | 364/200 |
| 4,442,505 | 4/1984 | Takano | 364/900 |
| 4,452,136 | 6/1984 | Boynton et al. | 364/900 |
| 4,550,366 | 10/1985 | Toyama et al. | 364/136 |
| 4,583,834 | 4/1986 | Seko et al. | 355/14 |
| 4,616,946 | 10/1986 | Murata et al. | 400/61 |
| 4,628,478 | 12/1986 | Henderson, Jr. | 395/325 |
| 4,698,753 | 10/1987 | Habbins et al. | 395/325 |
| 4,720,813 | 1/1988 | Kaneko | 364/900 |
| 4,737,907 | 4/1988 | Federico et al. | 364/200 |
| 4,774,593 | 9/1988 | Deguchi et al. | 358/301 |
| 4,821,107 | 4/1989 | Naito et al. | 358/256 |
| 4,947,345 | 8/1990 | Paradise et al. | 364/519 |
| 4,965,676 | 10/1990 | Ejiri et al. | 358/406 |
| 4,989,176 | 1/1991 | Khan | 395/325 |
| 4,994,988 | 2/1991 | Yokoi | 364/519 |
| 5,003,580 | 3/1991 | Duong et al. | 379/93 |
| 5,077,582 | 12/1991 | Kravette et al. | 355/206 |
| 5,079,740 | 1/1992 | Patel et al. | 364/900 |
| 5,084,875 | 1/1992 | Weinberger et al. | 371/29.1 |
| 5,129,065 | 7/1992 | Priem et al. | 395/325 |
| 5,184,179 | 2/1993 | Tarr et al. | 355/206 |

FOREIGN PATENT DOCUMENTS

| | | | |
|---|---|---|---|
| 0212335 | 3/1987 | European Pat. Off. | G06F 3/12 |
| 3921617 | 1/1990 | Germany . | |
| 59-22475 | 2/1984 | Japan . | |
| 58-014500 | 8/1984 | Japan . | |
| 61-251258 | 11/1986 | Japan . | |
| 0202966 | 8/1989 | Japan . | |
| 2227112 | 7/1990 | United Kingdom | B41J 29/40 |

*Primary Examiner*—Jack B. Harvey
*Assistant Examiner*—Glenn A. Auve
*Attorney, Agent, or Firm*—Oblon, Spivak, McClelland, Maier, & Neustadt

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

34 Claims, 7 Drawing Sheets

Type
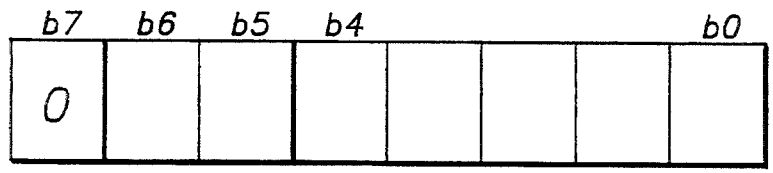
Information
00 Normal
01 Error
10 Composit
11 Urgent
Type Nnmber
1–30 Type
11111 Extention.....00h 00h
Length
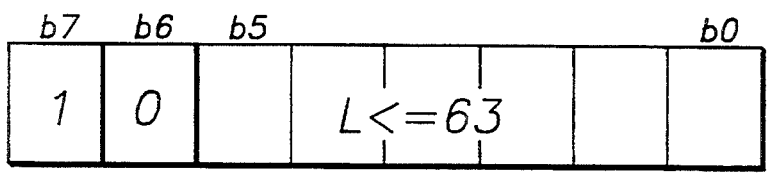
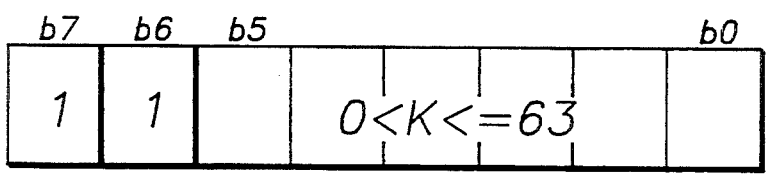
Following K bytes specify the length
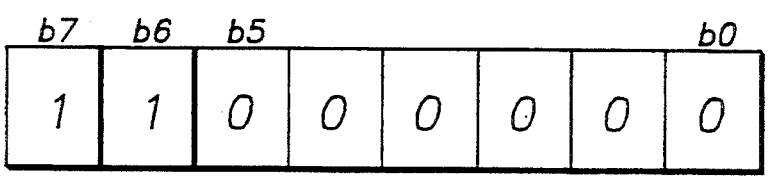
...00H 00H
Indefinite
FIG,-3

| Engine | Panel | Data | Comment |
|---|---|---|---|
| Power On | Power On | | |
| 1 ↓ | | 02, 81, 02 | Identifying as Ope. Panel Engine is busy for power-on reset |
| 2 ↑ | | 02, 81, 01 | Engine identifying itself |
| 3 ↓ | | 01, 81, 02 | Ack Identify (02) |
| 4 ↓ | | 02, 81, 02 | First Identify timed out. Try again |
| 5 ↑ | | 01, 81, 02 | Ack Identify (02) Connection established. |
| 6 ↓ | | 03, 81, 04 | # of copies specified. |
| 7 ↑ | | 01, 81, 03 | Ack # of copies (03) |
| 8 ↓ | | 04, 80 | Start |
| 9 ↑ | | 01, 81, 04 | Ack Start (04) |
| 10 ↑ | | 61, 80 | Paper Jam |
| 11 ↓ | | 01, 81, 61 | Ack Paper Jam |

FIG.—4

| Engine | Diag. | Data | Comment |
|---|---|---|---|
| 1 | ←----- | 02, 81, 03 | Identifying Diagnostic System |
| 2 | -----→ | 01, 81, 02 | Ack Identity |
| 3 | ←----- | 06, 81, 01 | Inquiry Identity |
| 4 | -----→ | 41, 86, 01, 81, 06, 07, 81, 01 | Composit Ack. Ack Inquiry and Report Identity = 1 |
| 5 | ←----- | 06, 81, 02 | Inquiry Model |
| 6 | -----→ | 41, 86, 01, 81, 06, 07, 81, 02 | Composit Ack. Ack Inquiry and Report Model = 2. |
| 7 | ←----- | 09, 84, 00, 01, 00, 02 | Parameters (1, 2) report |
| 8 | -----→ | 21, 81, 09 | Command not understood |
| 9 | ←----- | 08, 84, 00, 00, 01, C1 | Report Address (01C1) |
| 10 | -----→ | 01, 81, 08 | Ack |
| 11 | -----→ | 07, 87, 00, 00, 01, C1, 3D, FF | Report 01C1 = FF |
| 12 | ←----- | 01, 81, 07 | Ack |

FIG. –5

METHOD AND APPARATUS FOR CONTROLLING AND COMMUNICATING WITH BUSINESS OFFICE DEVICES

This is a continuation of application Ser. No. 07/902,462 filed Jun. 19, 1992, which is a continuation of prior application Ser. No. 07/759,278 filed Jul. 6, 1990, both now abandoned.

BACKGROUND OF THE INVENTION

The present invention relates to a method and apparatus for communicating and controlling various types of business office equipment or devices transparently and uniformly. The types of business equipment could be copiers, facsimiles and/or printers.

The creation of business office devices such as a copier, facsimile or printer requires activities assigned to various groups which must be integrated into at a certain time. In addition, once the device goes to customers, it must be maintained by a field service group. Therefore, different groups of people work together to develop and maintain the product.

The current trend of using microprocessors in business devices increased the capability of the devices. For example, high speed copiers usually have more than one microprocessor performing various tasks, including an operation panel consisting of many buttons and displays, controlled by a microprocessor.

As the use of microprocessors increases, a shortage of software engineers becomes critical. Fathi and Armstrong (1985) showed the cost ratio of development between hardware and software as 1 to 5.3. The current practice of developing devices, particularly stand-alone devices such as copiers, tends to ignore reusability of software across different models. For example, an operation panel of a copier is programmed by an engineer who develops the software of the main controller. The software is closely tied to a particular model and usually cannot be used by other copier models. If this trend does not change, the development of various modules by different groups cannot be easily integrated. Moreover, the shortage of software engineers is likely to limit the number of product developments and modification.

SUMMARY OF THE INVENTION

The foregoing problems can be solved and product development cycles can be shortened by providing a means and corresponding method to communicate and control various modules of a device across models and products. This allows several groups to start developing modules using existing devices rather than waiting for a target device to be developed. In addition, field service organization can support diagnostic and maintenance activities with one intelligent system, rather than having different systems for various products.

It is therefore an object of the present invention to provide an improved means and method of allowing an external device or devices to access the state of the target device(s), to communicate with the target device(s) and to control the target device(s).

Additional objects, advantages and novel features of the present invention will be set forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

FIG. 3 depicts an encoding scheme which can be used for communication with the present invention.

FIG. 4 depicts an example of a handshake between a copier engine and operation panel after power-up.

FIG. 5 depicts an example of how a diagnostic station can be connected in accordance with the present invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
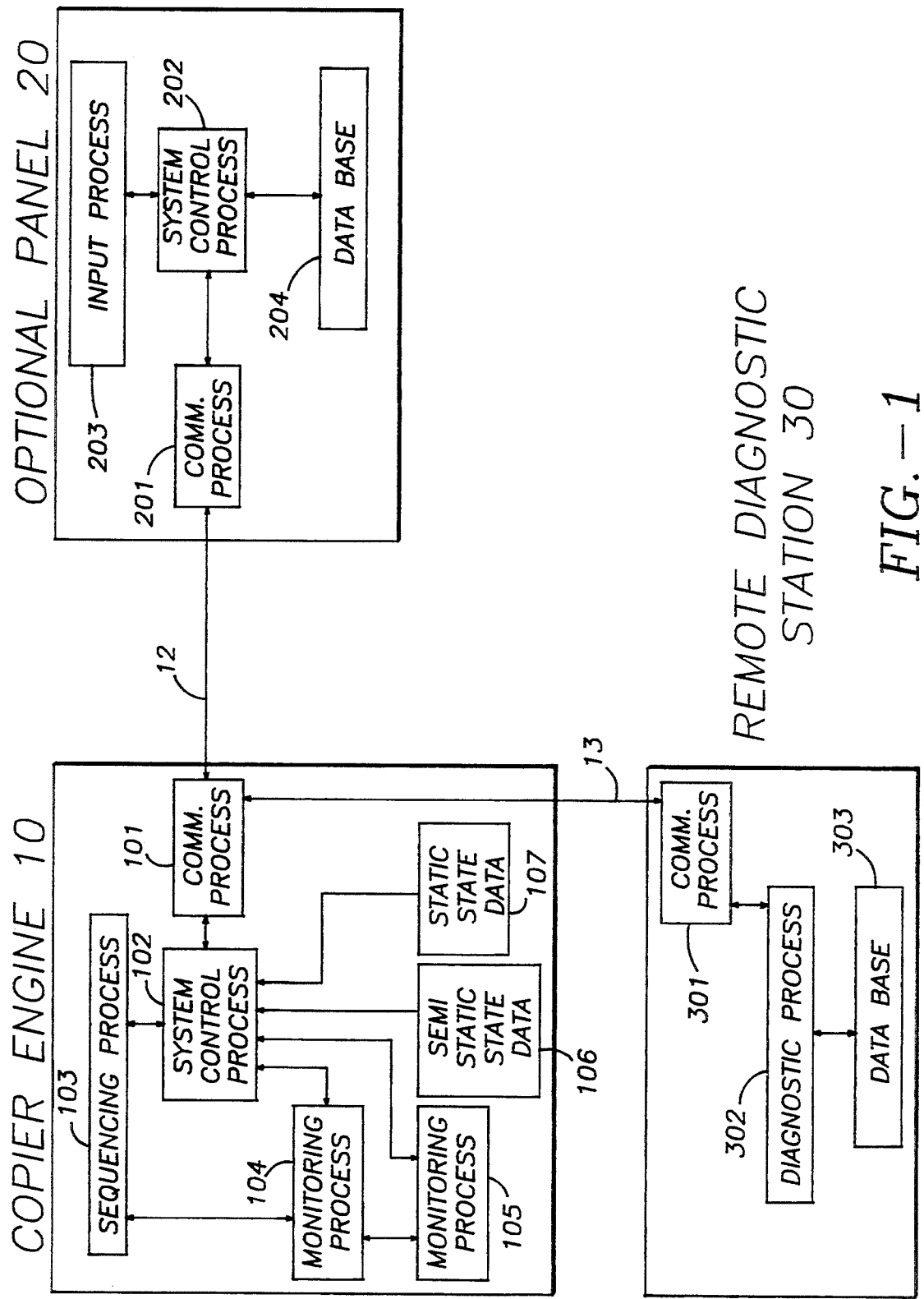
FIG. 1 depicts a functional system overview under which the present invention can be applied.

FIG. 1 illustrates a preferred embodiment of the present invention including a copier engine 10, operation panel 20, and remote diagnostic station 30. However, the present invention is not limited to copier devices, and can be applied to other business equipment devices, such as a printer or facsimile, which has means which are described below.

In the following illustration, the target device in FIG. 1 is a copier engine 10. The target device 10 includes means to store Static State Data 107, which does not change over the life of the device, such as the model number, serial number, model characteristics and the like. Target device 10 includes means to store Semi-Static State Data 106, which may change over the life of the device infrequently, such as the ROM version, option configuration, and the like.

In addition, the target device has means to store Dynamic State Data 105, which changes according to the mechanical state of the device, such as the paper status in the tray, oil, toner, number of prints, sensitivity of the photoreceptor, paper path and location, and the like. In order to store the dynamic state of the device, the target device 10 includes Monitoring Process 104 to monitor the state of device 10. Overall system activities are coordinated by System Control Process 102.

At power-on time, System Control Process 102 not only brings up the target device 10, but also establishes the communication with attached devices by first checking the physical connection and then establishing the communication by means which will be described below.

Copier engine 10 is idle until a user specifies some function through Operation Panel 20. During the idle time, however, System Control Process 102 continuously monitors its state through Monitoring Process 104. If abnormal states are detected, System Control Process 102 sends data to Communication Process 101, which codes data and sends the coded data to the Operation panel 20 through communication media line 12. Communication Process 201 sends acknowledgement, decodes data and sends it to System Control Process 202. System Control Process 202 then notifies the state of Copier Engine 10 through Display Process 204.

If communication line 13 to Remote Diagnostic Station is connected, System Control Process 102 can send a message to get the attention of Remote Diagnostic Station 30 to notify station 30 of an abnormal state.

Input Process 203 receives input from a user and sends the data to System Control Process 202, which then echoes back the input through Display Process 204, so that the user can get feedback of his/her input. The data from the user is then coded in Communication Process 201. The coded data is then sent to Copier Engine through line 12.

Communication Process 101 then sends an acknowledgement to 201, decodes the received data and sends the decoded data to System Contol Process 102. During the actual copying, Sequencing Process 103 sequences events according to timing requirements. Remote Diagnostic Station 30 is connected with Copier Engine through line 13, which can be a telephone line, RS232 line, or any other suitable communication means. Communication process 301 acts similarly as process 101 and process 201 of engine 10 and panel 20, respectively.

Diagnostic Process 302 is an intelligent process which can communicate interactively with Copier engine 10 based upon the responses it receives and data accumulated in the Data Base 303.

Figure 2:
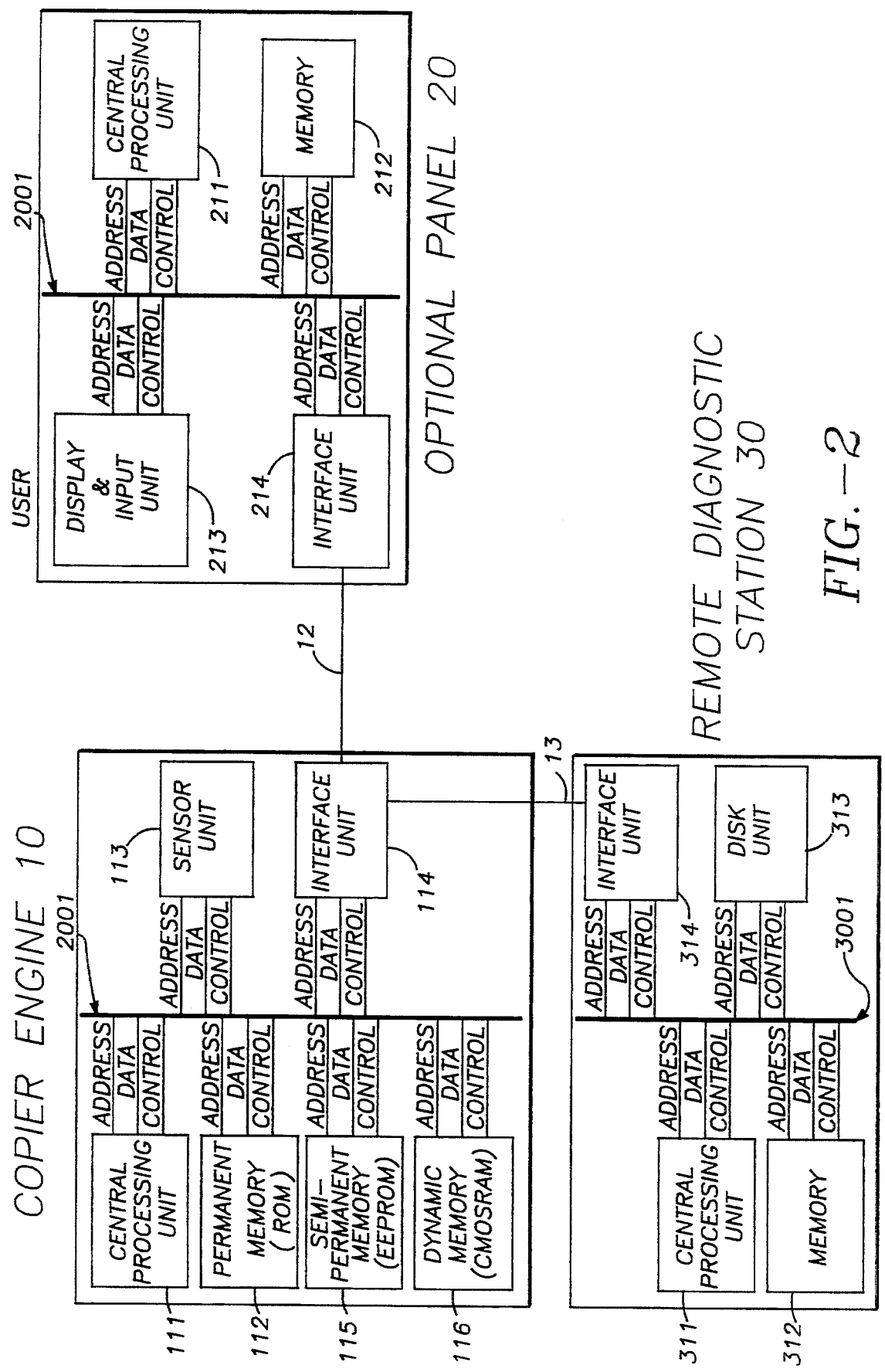
FIG. 2 depicts the hardware aspects of an implementation of the present invention.

FIG. 2 illustrates hardware features utilized to implement the present invention. All devices 10, 20, 30 have buses 1001, 2001, and 3001, which connect Interface Unit Units 114, 214, and 314 respectively. Depending upon the model, a bus could have more units. Sensor unit 113 senses the mechanical states of the target device which must be stored as Dynamic Data, such as paper tray, voltage and paper path.

Memory 112 holds Static State Data 107 as a permanent memory (such as ROM). Memory 115 stores Semi-Static State Data 106 in changeable memory which does not require power, such as EEPROM, or which uses low power and can be supported by a battery (CMOS RAM). Memory 116 stores Dynamic State Data 105 in a changeable memory, which does not require power or which uses low power and can be supported by a battery.

Display and Input Unit 213 controls input keys and displays, such as lights and LCD. Disk unit 313 holds the data base. If the communication line 13 is not connected regularly or gets connected only when diagnostics are needed, the Interface Unit 114 has a means to notify Central Processing Unit 111 that line 13 is connected, such as an interrupt caused by mechanical means of physical connection.

FIG. 3 illustrates a preferred embodiment of encoding according to the present invention. However, other encoding such as ASN.1 (1987) can be used instead. The encoding scheme in FIG. 3 consists of sending Type, Length and Value (TLV) encoding. Bit 7 of Type is set to 0 while bit 7 of Length is set to 1. Values can take any bit combination. The encoding is binary to save the length of the data communication. Combined with the information field, up to 120 types (4 information×30 types) can be defined. One method to extend the type is to set all low 5 bits to 1. The terminator of this extension is two bytes of 00H. Using Composite in the information field, more than one information can be sent as follows:

010xxxxx L1 T2 L2 V2 T3 L3 V3 where L1 is the byte length of T2 through V3. L2 is the byte length of V2, and L3 is the byte length of V3. Composite is not limited to two.

Table 1 below shows codes for Type and Value. These codes are shown as an illustration, and actual implementation may vary depending upon the application.

TABLE I

| Information | Type and Value | |
|---|---|---|
| | Type | Content |
| 00 | 1 | Acknowledgement |
| 00 | 2 | Identify |
| 00 | 3 | # of Copies |
| 00 | 4 | Start |
| 00 | 5 | Done |
| 00 | 6 | Inquiry |
| 00 | 7 | Report |
| 00 | 8 | Address Content Report |
| 00 | 9 | Parameter Report |
| 01 | 1 | Command Not Understood |
| 10 | 1 | Composite Acknowledgement |
| 11 | 1 | Jam |
| | | Identify Values |
| | 1 | Copier Engine |
| | 2 | Operation Panel |
| | 3 | Diagnostic |
| | | Inquiry Values |
| | 1 | Identity |
| | 2 | Model |

The scheme as shown in FIG. 3 can be encoded by system control process 102 in copier engine 10, system control process 202 in operation panel 20 and diagnostic process 302 in remote diagnostic station 30.

FIG. 4 illustrates the establishment of communication between engine 10 and operation panel 20 of FIGS. 1 or 2 after power-on. Both engine 10 and operation panel 20 go through power on reset sequence. At step 1, operation panel 20 finishes the reset and sends its assigned value to engine 10. However, engine 10 is still busy with reset and cannot receive the data through the interface unit 101.

At step 2, engine 10 is ready and sends the assigned value to panel 20. Step 3 shows the acknowledgement from panel 20 to engine 10. In a preferred embodiment, the receiving side must return the acknowledgement with the received Type.

In FIG. 4, step 4 illustrates that a First Identify has timed out and another attempt should be made.

Step 5 illustrates that the connection has been established.

Step 6 illustrates an example of the number of copies specified and the acknowledgement in step 7 reflects the number of copies (here, 3 copies).

Step 8 illustrates the start of the copying sequence, and step 9 indicates the corresponding acknowledgement.

Step 10 illustrates the communication of a paper jam, and step 11 illustrates the corresponding acknowledgement of that paper jam.

FIG. 5 illustrates the process of establishing the connection between Diagnostic Station 30 and Copier Engine 10 of FIGS. 1 and 2. It is assumed that the engine power is on. FIG. 5 illustrates the use of Composite information field on lines 4 and 6. If Composite is not used, communication such as lines 10 through 12 is needed.

Step 1 in FIG. 5 illustrates the identifying diagnostic, and step 2 illustrates the acknowledgement of the identification.

Step 3 illustrates the identification inquiry, and step 4 illustrates a composite acknowledgement.

Step 5 inquires as to the model identification, and step 6 is the corresponding acknowledgement.

Step 7 asks for a report of parameters and, as an illustration, step 8 illustrates the command is not understood.

Step 9 illustrates a reporting of address, and steps 10, 11 and 12 reflect the acknowledgement, report and acknowledgement, respectively.

Figure 6:
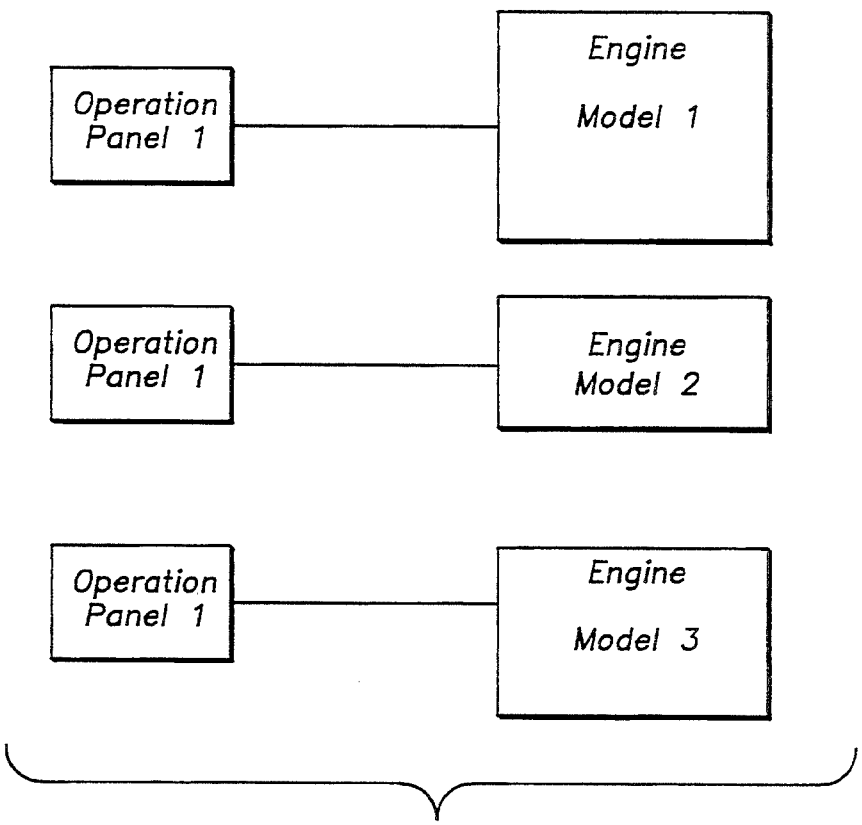
FIGS. 6-8 show examples of other embodiments of the present invention.

FIG. 6 shows an example of another embodiment of the present invention in which an operation panel 1 can control different types of engine models identified as Engine Model 1, Model 2 and Model 3.

Figure 7:
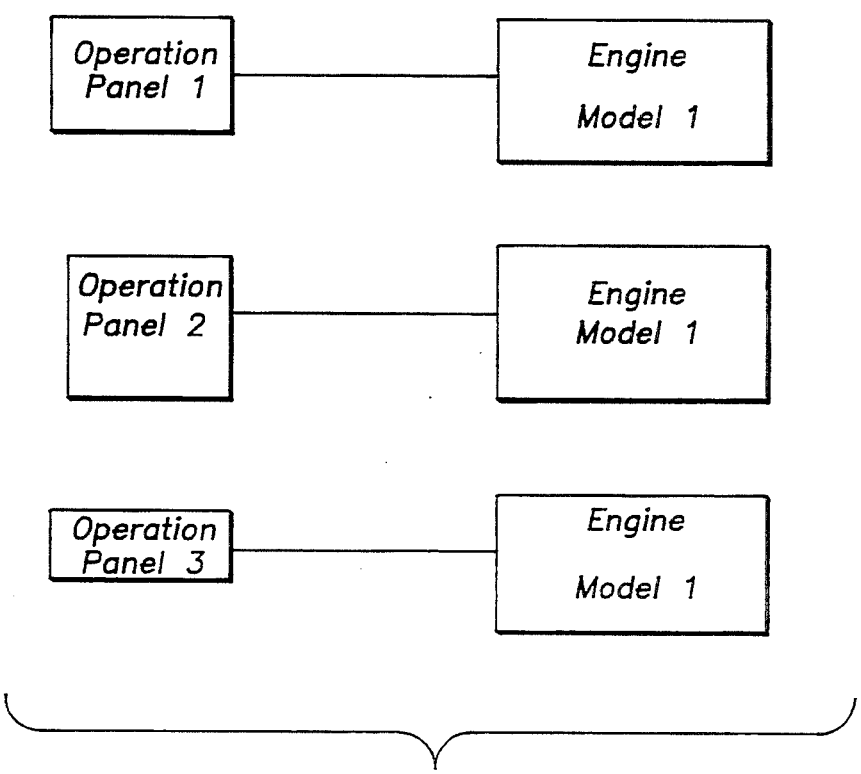

FIG. 7 shows an embodiment of the invention in which different operation panels such as panels 1, 2 or 3 can control the same engine models identified as engine model 1.

Figure 8:
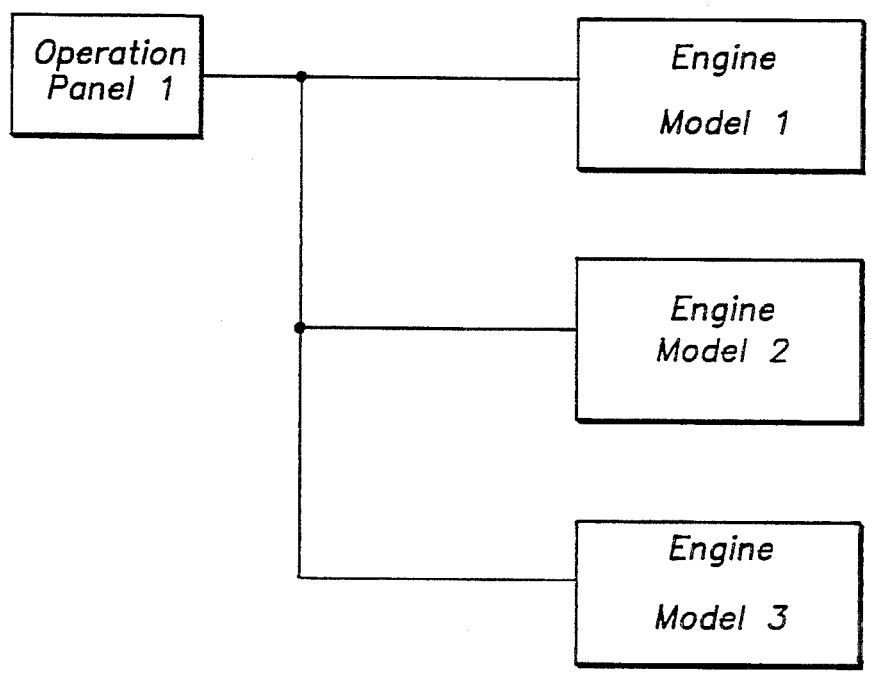
Figure 1:
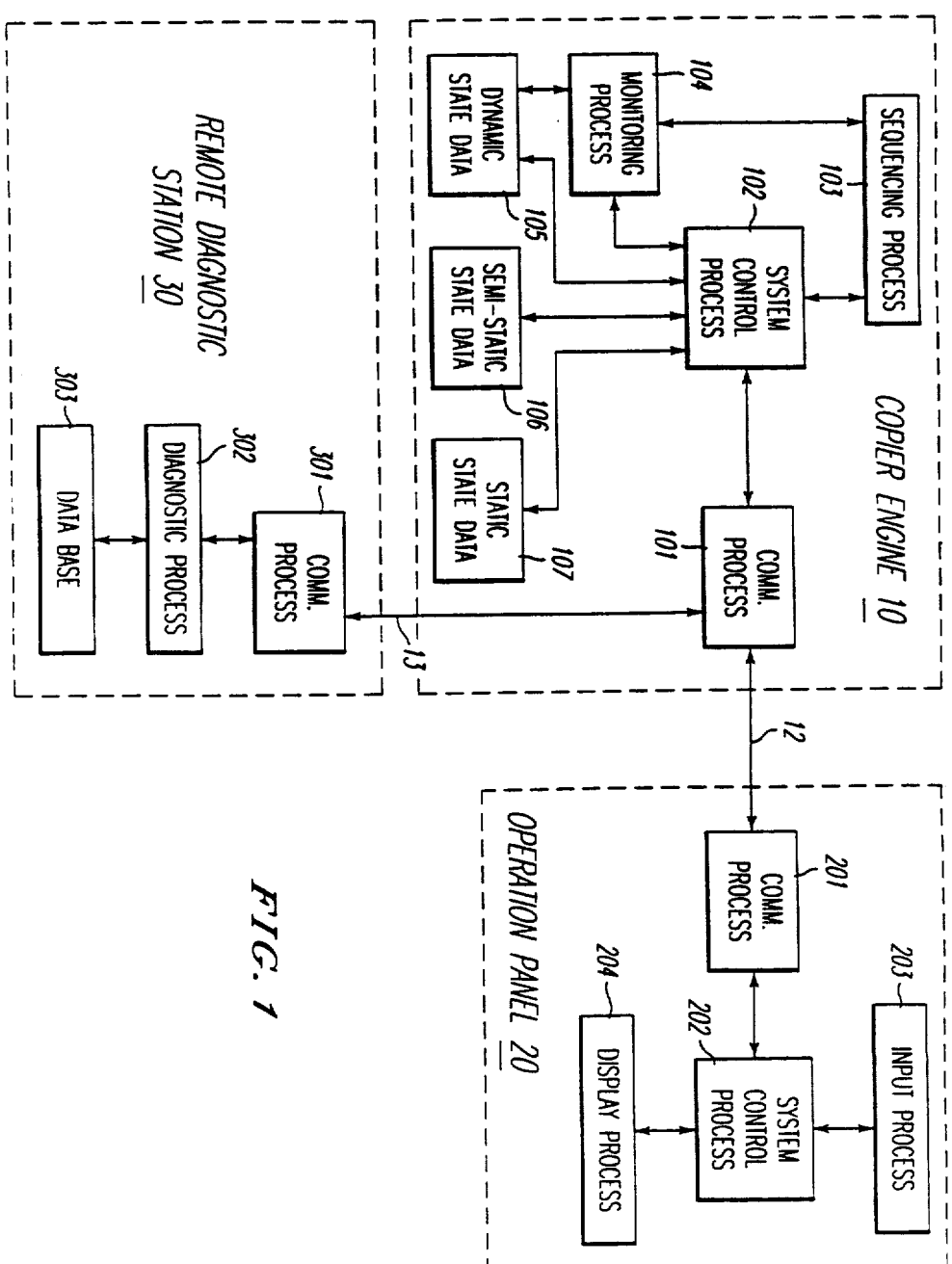
Figure 2:
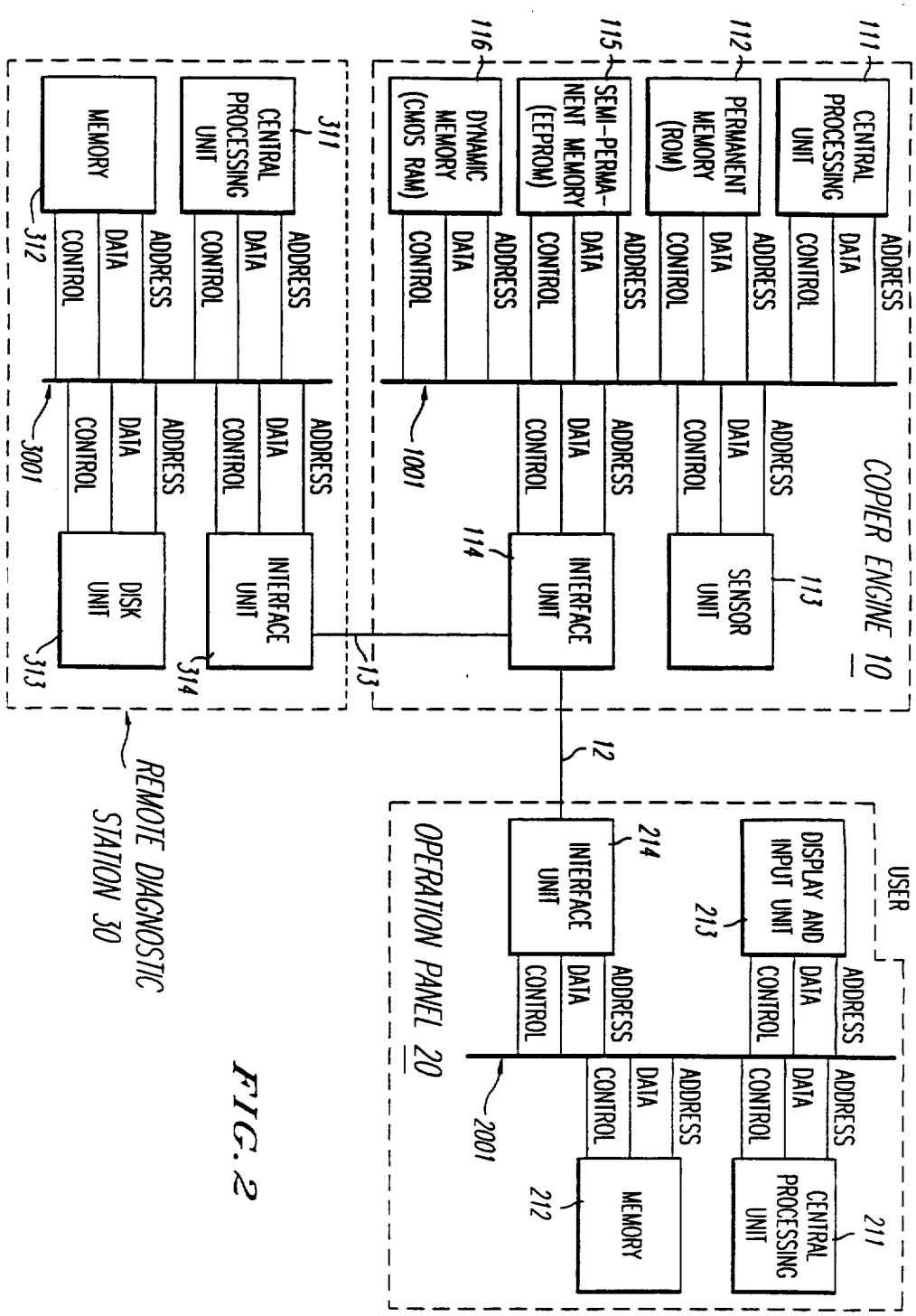

Finally, FIG. 8 shows an operation panel 1 controlling different engine models, identified as engine models 1, 2 and 3. In FIG. 8, operation panel 1 could control models 1, 2 or 3 by a suitable bus interconnection and suitable multiplexing capability.

In conclusion, the present invention provides a means and corresponding method for controlling, monitoring and communicating with office equipment devices by using the following:

Means to control various activities of the system (System Control Process)
Means to store static data (Static State Data)
Means to store semi-static data (Semi-Dynamic State Data)
Means to store dynamic data (Dynamic State Data)
Means to monitor the state of the device (Monitoring Process)
Means to get the state of device from the monitoring means and store the state into the storage of dynamic data (Monitoring Process→System Control Process)→Dynamic State Data)
Means to communicate other devices such as RS232 or modem/telephone (Communication Process)
Means to identify itself to other devices (Communication Process)

In the embodiment as shown in FIG. 1, copier engine 10, operation panel 20 and remote diagnostic station 30 have their respective processors (102, 202 and 302) for providing the state data and/or control data including identification to indicate the source of generating the state data and/or control data and for controlling their respective overall activities. The copier engine, operation panel and remote diagnostic station also include their respective communication processors (101, 201 and 301) for receiving and transmitting the state data and/or control data and for acknowledging the receipt of the state data, control data and identification. To sent the state data and/or control data to the communication line (12 or 13), the data sender first provides the data to the respective communication processor. To receive the stat data and/or control data from the communication line, the receiver first receives the data in the respective communication processor. After the state data and/or control data have been received, the communication processor or at the receiver side provides an acknowledgment of the communication line.

Means to exchange commands and data such as reply (Communication Process)
Means to interpret commands (System Control Process)
Means to take actions based upon the commands (System Control Process)
Means to send results of actions (System Control Process→Communication Process)
Means to notify when the new communication line is established (Communication Process→System Control Process: Interface Unit-interrupt→CPU)

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A system for controlling communication of at least one of state data including static, semi-static or dynamic data or combinations thereof and control data, comprising:

at least one office device and an operation terminal, wherein each of said at least one office device communicates with a first end of a respective communication line connected between each of said at least one office device and said operation terminal, and wherein said operation terminal communicates with each of said at least one office device through a second end of the respective communication line, wherein each of said at least one office device includes:

means for generating said at least one of state data and control data as binary signals, including information representative of a type of data and a length of the binary signals, means, coupled to said means for generating, for storing said at least one of state data and control data, office device processor means, coupled to said storing means, for processing said at least one of state data and control data and for controlling said office device in response to said processing, and office device communication interface means, having an output coupled to said first end of the respective communication line and having an input coupled to said office device processor means, for interfacing transmission of said at least one of state data and control data between said office device and said respective communication line; and wherein said operation terminal includes:

operation terminal communication interface means, coupled to said second end of the respective communication line of each of said at least one office device, for interfacing transmission of said at least one of state data and control data between said operation terminal and said respective communication line, and operation terminal processor means, coupled to said operation terminal communication interface means, for processing said at least one of state data and control data, wherein said operation terminal communication interface means communicates with said communication interface means of each of said at least one office device through the respective communication line thereof.

2. A system for controlling communication of at least one of state data including static, semi-static or dynamic data or a combination thereof and control data, comprising: an office device; and at least one operation terminal, each of said at least one operation terminal is for communicating with a first end of a respective communication line connected thereto, and said office device is connected to a second end of the respective communication line of each of said at least one operation terminal, wherein said office device includes:

means for generating at least one of state data and control data binary signals having information indicating a type of data and a length of the binary signals, means for storing said at least one of state data and control data, office device processor means, coupled to said storing means, for processing said at least one of state data and control data and for controlling said office device in response to the processing said at least one of state data and control data, and office device communication interface means, having an output coupled to said second end of each of said respective communication lines and having an input coupled to said office device processor means, for interfacing transmission of said at least one of state data and control data between said office device and said respective communication line, and wherein each of said at least one operation terminal includes:

operation terminal interface means, coupled to said first end of said respective communication line, for interfacing communication of said at least one state data and control data between said operation terminal and said respective communication line, and operation terminal processor means, coupled to said operation terminal interface means, for processing said at least one of state data and control data, wherein said office device communication interface means communicates with said operation terminal interface means of each of said at least one operation terminal through the respective communication line.

3. A system for controlling communication of at least one of state data and control data through a communication line, comprising:

a copier machine communicating with a first end of said communication line, said copier machine including:

means for generating said at least one of state data and control data which includes a source identification indicating a generating source of said at least one of state data and control data, means, coupled to said means for generating, for storing said at least one of state data and control data, and copier machine processor means, coupled to said storing means, for processing said at least one of state data and control data and for controlling said copier machine in response to the processing of said at least one of state data and control data, and copier machine communication interface means, having an output coupled to said first end of said communication line and an input coupled to said copier machine processor means, for interfacing transmission of said at least one of state data and control data between said copier machine and said communication line, and for acknowledging receipt of said at least one of state data and control data received from said communication line; and an operation terminal communicating with a second end of said communication line, said operation terminal including:

operation terminal communication interface means, coupled to said second end of said communication line, for interfacing transmission of said at least one of state data and control data between said operation terminal and said communication line, and for acknowledging receipt of said at least one of state data and control data received from said communication line, and processor means, coupled to said operation terminal communication interface means, for processing said at least one of state data and control data.

4. The system as in claim 3, wherein said storing means comprises:

means for storing static state data representing characteristics of said copier machine which are constant over a life of said copier machine, means for storing semi-static state data which infrequently changes over the life of said copier machine, and means for storing dynamic state data which changes according to at least one of a mechanical and an electrical state of said copier machine.

5. The system as in claim 3, wherein said storing means comprises means for storing static state data representing characteristics of said copier machine which do not change over a life of said copier machine.

6. The system as in claim 3, wherein said storing means comprises means for storing semi-static state data which infrequently changes over a life of said copier machine.

7. The system as in claim 3, wherein said storing means comprises means for storing dynamic state data which changes according to at least one of a mechanical and an electrical state of said copier machine.

8. A method for use with a system for controlling communication of at least one of state data and control data between an office device and a remote operation terminal through a communication line, wherein first data is defined to be at least one of said state data and control data generated at said office device and second data is defined to be at least one of said state data and control data generated at said remote operation terminal, and wherein said office device includes an office device communication interface and said remote operation terminal includes an operation terminal communication interface, said method comprising the steps of:

1. communicating said first data from said office device to said remote operation terminal, said communicating step including:
   a. generating at said device, said first data as binary signals including information representative of a type of data and a length of the binary signals,
   b. transmitting said first data from said office device communication interface to said operation terminal communication interface through said communication line,
   c. processing said first data by the remote operation terminal; and
2. communicating said second data from said remote operation terminal to said office device, said communicating step including:
   d. generating at the remote operation terminal, said second data as binary signals including information representative of a type of data and a length of the binary signals,
   e. transmitting said second data from said operation terminal communication interface to said office device communication interface through said communication line,
   f. processing, by said office device, at least one of said first and second data and controlling said office device in response to said processing of at least one of said first and second data.

9. The method as in claim 8 wherein said office device includes an office device processor and said operation terminal includes an operation terminal processor means;
   wherein said step 1 further comprises the step of interpreting said first data by said operation terminal processor;
   wherein said step c processes said interpreted first data;
   wherein said step 2 further comprises the step of interpreting said second data by said office device processor; and
   wherein said step f processes said interpreted second data.

10. A system for controlling communication of at least one of state data and control data through a communication line, comprising:
   an office machine communicating with a first end of said communication line; and
   an operation terminal communicating with a second end of said communication line;
   wherein said office machine includes:
      means for generating first data which is said at least one of state data and control data as binary signals including information representative of a type of data and a length of the binary signals,
      means for storing at least one of said first and second data, said second data is at least one of state data and control data generated at said operation terminal,
      office machine processor means, coupled to said storing means, for processing at least one of said first and second data and for controlling said office machine in response to said processing,
      office machine communication interface means, having an output coupled to said first end of said communication line and an input coupled to said office machine processor means, for interfacing transmission of said first data binary signals between said office machine and said communication line;
   wherein said operation terminal includes:
      means for generating said second data as binary signals containing information representative of a type of data and a length of binary signals,
      operation terminal communication interface means, coupled to said second end of communication line, for interfacing transmission of said data between said operation terminal and said communication line, and
      processor means, coupled to said operation terminal communication interface means, for processing at least one of said first and second data.

11. A system as in claim 10 in which said office machine is a copier.

12. A system as in claim 10 in which said office machine is a printer.

13. A system as in claim 10 in which said office machine is a facsimile machine.

14. A system for controlling communication of at least one of state data and control data through a communication line, comprising:
   an office machine communicating with a first end of said communication line, said office machine including:
      means for generating said at least one of state data and control data binary signals including information representative of a type of data and a length of the binary signals,
      means, coupled to said means for generating, for storing said at least one of state data and control data,
      office machine processor means, coupled to said storing means, for processing said at least one of state data and control data and controlling said office machine in response to said processing,
      office machine communication interface means, having an output coupled to said first end of said communication line and an input coupled to said office machine processor means, for interfacing transmission of said at least one of state data and control data binary signals between said office machine and said communication line; and
   a diagnostic processor communicating with a second end of said communication line for processing said at least one of state data and control data binary signals received from said office machine processor means to diagnose operation of the office machine and to communicate interactively with the office machine.

15. A system for controlling communication of at least one of state data including static, semi-static, or dynamic data or combinations thereof and control data through a communication line, comprising:
   an office device communicating with a first end of said communication line, said office device including:
      means for storing said at least one of state data and control data,
      office device processor means, coupled to said storing means, for processing said at least one of state data and control data and for controlling said office device in response to said processing, and
      office device communication interface means, having an output coupled to said first end of said communication line and having an input coupled to said office device processor means, for interfacing transmission of said at least one of state data and control data between said office device and said communication line;

a remote operation terminal communicating with a second end of said communication line, including:

operation terminal communication interface means, coupled to said second end of said communication line, for interfacing transmission of said at least one of state data and control data between said operation terminal and said communication line, operation terminal processor means, coupled to said operation terminal communication interface means, for processing said at least one of state data and control data, and an operation panel including:

input processor means, coupled to said operation terminal processor, for inputting user specified control functions, and display processor means, coupled to said operation terminal processor, for at least one of processing inputs from said input processor means and processing said at least one of state data and control data into display information.

16. A system for controlling communication of at least one of state data and control data through a communication line, comprising:

an office machine communicating with a first end of said communication line, said office machine including:

means for storing said at least one of state data and control data, office device processor means, coupled to said storing means, for processing said at least one of state data and control data and controlling said office device in response to the processing of said at least one of state data and control data, and office device communication interface means, having an output coupled to said first end of said communication line and having an input coupled to said office device processor means, for interfacing transmission of said at least one of state data and control data between said office device and said communication line; and a remote operation terminal communicating with a second end of said communication line, wherein said remote operation terminal is a remote diagnostic station for remotely diagnosing operation of said office device, said remote operation terminal including:

operation terminal communication interface means, coupled to said second end of said communication line, for interfacing transmission of said at least one of state data and control data between said operation terminal and said communication line, operation terminal processor means, coupled to said operation terminal communication interface means, for processing said at least one of state data and control data, and storage means for storing said at least one of state data and control data received from said office device through said communication line.

17. The system as in claim 16, including means for exchanging said at least one of state data and said control data between said office device and said operation terminal.

18. A system for controlling communication of at least one of state data and control data through a communication line, comprising:

an office device communicating with a first end of said communication line; and a remote operation terminal communicating with a second end of said communication line;

wherein said office machine includes:

means for generating first data which is at least one of said state data and control data, said first data being generated as binary signals including information representative of a type of data and a length of the binary signals, and a source identification to indicate a generating source of said first data, means for storing at least one of said first and second data, said second data is at least one of state data and control data generated at said remote operation terminal, wherein said storing means comprises:

means for storing static state data representing characteristics of said office device which do not change over a life of said office device, said static state data including a model number, a serial number and model characteristics, means for storing semi-static state data which changes over the life of said office device, said semi-static state including a ROM version and an option configuration of said office device, and means for storing dynamic state data which changes according to at least one of a mechanical and an electrical state of said office device, office device processor means, coupled to said storing means, for processing at least one of said first and second data, and for controlling said office device in response to said processing, office device communication interface means, having an output coupled to said first end of said communication line and having an input coupled to said office device processor means, for interfacing transmission of said first data between said office device and said communication line, means for monitoring a dynamic state of said office device, means for storing said monitored dynamic state into said dynamic data storing means, and means for sending said dynamic state to said office device communication interface for transmission over said communication line; wherein said remote operation terminal includes:

means for generating said second data as binary signals including information representative of a type of data and a length of the binary signals, and a source identification to indicate a generating source of said at least one of state data and control data, operation terminal communication interface means, coupled to said second end of said communication line, for interfacing transmission of said second data between said operation terminal and said communication line, and operation terminal processor means, coupled to said operation terminal communication interface means, for processing at least one of said first and second data.

19. A system for controlling communication of at least one of state data and control data through a communication line, comprising:
- an office device communicating with a first end of said communication line; and
- a remote operation terminal communicating with a second end of said communication line;
- wherein said office device includes:
  - means for generating first data which is at least one of said state data and control data, said first data being generated as binary signals including information representative of a type of data and a length of the binary signals, and a source identification to indicate a generating source of said first data,
  - means for storing at least one of said first and second data, said second data is at least one of state data and control data generated at said remote operation terminal,
  - office device processor means, coupled to said storing means, for processing at least one of said first and second data and for controlling said office device in response to said processing, and
  - office device communication interface means, having an output coupled to said first end of said communication line and having an input coupled to said office device processor means, for interfacing transmission of at least one of said first and second data between said office device and said communication line,
  - means for encoding the first data and decoding the second data;
- wherein said remote operation terminal includes:
  - means for generating said second data as binary signals including information representative of a type of data and a length of the binary signals, and a source identification of said second data,
  - operation terminal communication interface means, coupled to said second end of said communication line, for interfacing transmission of at least one of said first and second data between said operation terminal and said communication line,
  - operation terminal processor means, coupled to said operation terminal communication interface means, for processing said control data, and
  - means for encoding the second data and decoding the first data.

20. The system as in claim 19 wherein said office device processor means and said operation terminal processor means each include means for sending results of said processing by said office device processor means and said operating terminal processor means to respective communication interface means.

21. The system as in claim 20 including means for indicating when communication is established over said communication line between said office device communication interface means and said operation terminal communication interface means.

22. A system for controlling communication of at least one of state data and control data through a communication line, comprising:
- an office device communicating with a first end of said communication line; and
- a remote operation terminal communicating with a second end of said communication line;
- wherein said office device includes:
  - means for generating first data which is at least one of said state data and control data, said first data being generated as binary signals including information representative of a type of data and a length of the binary signals,
  - office device processor means, coupled to said storing means, for processing at least one of said first and second data and for controlling said office device in response to said processing, and
  - office device communication interface means, having an output coupled to said first end of said communication line and having an input coupled to said office device processor means, for interfacing transmission of at least one of said first and second data between said office device and said communication line; and wherein said remote operation terminal includes:
  - means for generating said second data as binary signals including information representative of a type of data and a length of the binary signals,
  - operation terminal communication interface means, coupled to said second end of said communication line, for interfacing transmission of at least one of said first and second data between said remote operation terminal and said communication line, and
  - operation terminal processor means, coupled to said operation terminal communication interface means, for processing at least one of said first and second data.

23. The system as in claim 22 wherein said at least one of state data and control data includes source identification information which indicates a generating source of at least one of said first and second data.

24. The system as in claim 23 wherein said office device and said operation terminal include means for encoding and decoding at least one of said first and second data.

25. The system as in claim 23 wherein at least one of said first and second data includes composition information.

26. The system as in claim 23, wherein said storing means comprises:
- means for storing static state data representing characteristics of said office device which do not change over a life of said office device, said static state data including a model number, a serial number and model characteristics,
- means for storing semi-static state data which infrequently changes over the life of said office device, said semi-static state data including a ROM version and an option configuration, and
- means for storing dynamic state data which changes according to at least one of a mechanical and an electrical state of said office device.

27. The system as in claim 23, wherein said operation terminal communicates with different models of said office device.

28. A method for use with a system for controlling communication of at least one of state data and control data between an office device and remote operation terminal through a communication line, wherein first data is defined to be at least one of said state data and control data generated within said office device and second data is defined to be at least one of said state data and control data generated within said remote operation terminal, and wherein said office device includes an office device communication interface and said remote operation terminal includes an operation terminal communication interface, said method comprising the steps of:

1. communicating said first data from said office device to said remote operation terminal, said communicating step including:
   a. generating said first data at said office device,
   b. storing static data representing characteristics of said office device which do not change over a life of said device,
   c. storing semi-static state data which infrequently change over the life of said device,
   d. storing dynamic state data which change according to at least one of a mechanical and an electrical state of said device,
   e. transmitting said first data from said office device communication interface to said operation terminal communication interface means through said communication line,
   f. processing, by said remote operation terminal, said transmitted first data; and
2. communicating said second data from said remote operation terminal to said office device, and communication step including:
   g. generating said second data at the remote operation terminal side,
   h. transmitting said second data from said operation terminal communication interface to said office device communication interface through said communication line,
   i. processing, by said office device, said control data received over said communication line and controlling said office device in response to said processing by said office device.

29. A system for controlling communication of at least one of state data and control data through a communication line, comprising:
    an office machine communicating with a first end of said communication line, wherein said office machine is a copier including:
       means for generating said at least one of state data and control data,
       means, coupled to said means for generating, for storing said at least one of state data and control data,
       office machine processor means, coupled to said storing means, for processing said at least one of state data and control data and controlling said office machine in response to said processing, and
       office machine communication interface means, having an output coupled to said first end of said communication line and an input coupled to said office machine processor means, for interfacing transmission of said at least one of state data and control data between said office machine and said communication line; and
    a diagnostic processor communicating with a second end of said communication line for processing said at least one of state data and control data received from said office machine processor means to diagnose an operation of the office machine and to communicate interactively with the office machine.

30. A system for controlling communication of at least one of state data and/or control data through a communication line, comprising:
    an office machine communicating with a first end of said communication line, wherein said office machine is a printer including:
       means for generating said at least one of state data and control data,
       means, coupled to said means for generating, for storing said at least one of state data and control data,
       office machine processor means, coupled to said storing means, for processing said at least one of state data and control data and controlling said office machine in response to said processing, and
       office machine communication interface means, having an output coupled to said first end of said communication line and an input coupled to said office machine processor means, for interfacing transmission of said at least one of state data and control data between said office machine and said communication line; and
    a diagnostic processor communicating with a second end of said communication line for processing said at least one of state data and control data received from said office machine processor means to diagnose an operation of the office machine and to communicate interactively with the office machine.

31. A system for controlling communication of at least one of state data and/or control data through a communication line, comprising:
    an office machine communicating with a first end of said communication line, wherein said office machine is a facsimile machine including:
       means for generating said at least one of state data and control data,
       means, coupled to said means for generating, for storing said at least one of state data and control data,
       office machine processor means, coupled to said storing means, for processing said at least one of state data and control data and controlling said office machine in response to said processing, and
       office machine communication interface means, having an output coupled to said first end of said communication line and an input coupled to said office machine processor means, for interfacing transmission of said at least one of state data and control data between said office machine and said communication line; and
    a diagnostic processor communicating with a second end of said communication line for processing said at least one of state data and control data received from said office machine processor means to diagnose an operation of the office machine and to communicate interactively with the office machine.

32. A method for use with a system for controlling communication of at least one of state data and control data between an office device and an operation terminal through a communication line, wherein first data is defined to be at least one of said state data and control data generated within said office device and second data is defined to be at least one of said state data and control data generated within said remote operation terminal, and wherein said office device includes an office device communication interface and said operation terminal includes an operation terminal communication interface, said method comprising the steps of:
1. communicating said first data from said office device to said operation terminal, said communicating step including:
   a. generating said first data at said office device,
   b. storing static state data representing characteristics of said office device which do not change over a life of said office device,
   c. transmitting said first data from said office device communication interface to said operation terminal communication interface through said communication line,
   d. processing said first data by the operation terminal; and
2. communicating said second data from said operation terminal to said office device including:
   e. generating said second data at the operation terminal,
   f. transmitting said second data from said operation terminal communication interface to said office device communication interface through said communication line,
   g. processing said second data by said office device and controlling said office device in response to the processing by the office device.

33. A method for use with a system for controlling communication of at least one of state data and control data between an office device and an operation terminal through a communication line, wherein first data is defined to be at least one of said state data and control data generated within said office device and second data is defined to be at least one of said state data and control data generated within said remote operation terminal, and wherein said office device includes an office device communication interface and said operation terminal includes an operation terminal communication interface, said method comprising the steps of:
1. communicating said first data from said office device to said operation terminal, said communicating step including:
   a. generating said first data at said office device,
   b. storing semi-static state data which infrequently changes over a life of said office device,
   c. transmitting said first data from said office device communication interface to said operation terminal communication interface through said communication line,
   d. processing said first data by the operation terminal; and
2. communicating said second data from said operation terminal to said office device including:
   e. generating said second data at the operation terminal,
   f. transmitting said second data from said operation terminal communication interface to said office device communication interface through said communication line,
   g. processing said second data by said office device and controlling said office device in response to the processing by the office device.

34. A method for use with a system for controlling communication of at least one of state data and control data between an office device and an operation terminal through a communication line, wherein first data is defined to be at least one of said state data and control data generated within said office device and second data is defined to be at least one of said state data and control data generated within said remote operation terminal, and wherein said office device includes an office device communication interface and said operation terminal includes an operation terminal communication interface, said method comprising the steps of:
1. communicating said first data from said office device to said operation terminal, said communicating step including:
   a. generating said first data at said office device,
   b. storing dynamic state data which changes according to at least one of a mechanical and an electrical state of said office device,
   c. transmitting said first data from said office device communication interface to said operation terminal communication interface through said communication line,
   d. processing said first data by the operation terminal; and
2. communicating said second data from said operation terminal to said office device including:
   e. generating said second data at the operation terminal,
   f. transmitting said second data from said operation terminal communication interface to said office device communication interface through said communication line,
   g. processing said second data by said office device and controlling said office device in response to the processing by the office device.

* * * * *

UNITED STATES PATENT AND TRADEMARK OFFICE
CERTIFICATE OF CORRECTION

PATENT NO. : 5,412,779
DATED : May 2, 1995
INVENTOR(S) : Tetsuro Motoyama

It is certified that error appears in the above-identified patent and that said Letters Patent is hereby corrected as shown below:

The Title page, showing an illustrative figure, should be deleted and substitute therefor the attached Title page.

Delete Drawing sheets 1, 2, 3, and 5 and substitute therefor the Drawing sheets, consisting of Figs. 1, 2, 3, and 5 as shown on the attached sheets.

United States Patent [19]
Motoyama

[11] Patent Number: 5,412,779
[45] Date of Patent: May 2, 1995

[54] METHOD AND APPARATUS FOR CONTROLLING AND COMMUNICATING WITH BUSINESS OFFICE DEVICES

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 282,168

[22] Filed: Jul. 28, 1994

Related U.S. Application Data

[63] Continuation of Ser. No. 902,462, Jun. 19, 1992, abandoned, which is a continuation of Ser. No. 549,278, Jul. 6, 1990, abandoned.

[51] Int. Cl.[6] .................................................. G06F 3/00
[52] U.S. Cl. .................................. 395/275; 395/200; 395/325; 355/203; 358/442
[58] Field of Search ...................... 395/325, 200, 275; 358/442; 371/11.4, 14, 29.1; 355/203, 204, 205, 206

[56] References Cited

U.S. PATENT DOCUMENTS

| | | | |
|---|---|---|---|
| 4,084,680 | 4/1978 | Deetz | 400/62 |
| 4,106,092 | 8/1978 | Millers, II | 364/200 |
| 4,162,520 | 7/1979 | Cook et al. | 364/200 |
| 4,218,740 | 8/1980 | Bennett et al. | 395/250 |
| 4,298,928 | 11/1981 | Etoh et al. | 395/325 |
| 4,368,512 | 1/1983 | Kyu et al. | 395/325 |
| 4,370,730 | 1/1983 | Chadra | 364/900 |
| 4,371,950 | 2/1983 | Chadra | 364/900 |
| 4,386,415 | 5/1983 | Chadra | 364/900 |
| 4,415,986 | 11/1983 | Chadra | 364/200 |
| 4,442,505 | 4/1984 | Takano | 364/900 |
| 4,452,136 | 6/1984 | Boynton et al. | 364/900 |
| 4,550,366 | 10/1985 | Toyama et al. | 364/136 |
| 4,583,834 | 4/1986 | Seko et al. | 355/14 |
| 4,616,946 | 10/1986 | Murata et al. | 400/61 |
| 4,628,478 | 12/1986 | Henderson, Jr. | 395/325 |
| 4,698,753 | 10/1987 | Habbins et al. | 395/325 |
| 4,720,813 | 1/1988 | Kaneko | 364/900 |
| 4,737,907 | 4/1988 | Federico et al. | 364/200 |
| 4,774,593 | 9/1988 | Deguchi et al. | 358/301 |
| 4,821,107 | 4/1989 | Naito et al. | 358/256 |
| 4,947,345 | 8/1990 | Paradise et al. | 364/519 |
| 4,965,676 | 10/1990 | Ejiri et al. | 358/406 |
| 4,989,176 | 1/1991 | Khan | 395/325 |
| 4,994,988 | 2/1991 | Yokoi | 364/519 |
| 5,003,580 | 3/1991 | Duong et al. | 379/93 |
| 5,077,582 | 12/1991 | Kravette et al. | 355/206 |
| 5,079,740 | 1/1992 | Patel et al. | 364/900 |
| 5,084,875 | 1/1992 | Weinberger et al. | 371/29.1 |
| 5,129,065 | 7/1992 | Priem et al. | 395/325 |
| 5,184,179 | 2/1993 | Tarr et al. | 355/206 |

FOREIGN PATENT DOCUMENTS

| | | | |
|---|---|---|---|
| 0212335 | 3/1987 | European Pat. Off. | G06F 3/12 |
| 3921617 | 1/1990 | Germany | |
| 59-22475 | 2/1984 | Japan | |
| 58-014500 | 8/1984 | Japan | |
| 61-251258 | 11/1986 | Japan | |
| 0202966 | 8/1989 | Japan | |
| 2227112 | 7/1990 | United Kingdom | B41J 29/40 |

*Primary Examiner*—Jack B. Harvey
*Assistant Examiner*—Glenn A. Auve
*Attorney, Agent, or Firm*—Oblon, Spivak, McClelland, Maier, & Neustadt

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

34 Claims, 7 Drawing Sheets

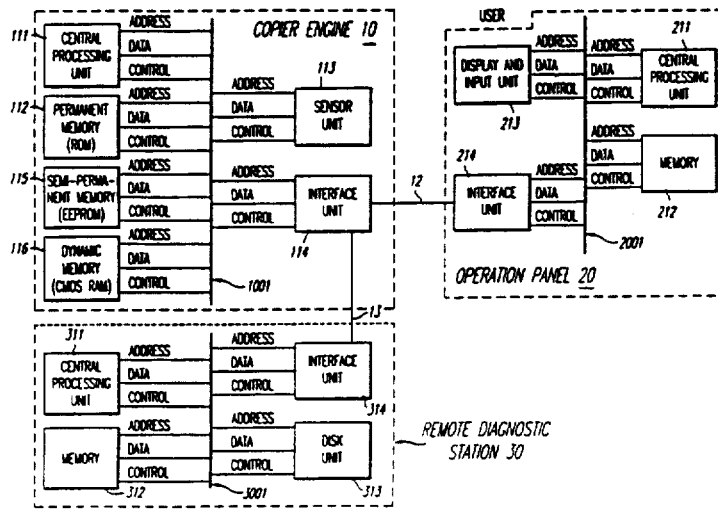

TYPE

| b7 | b6 | b5 | b4 | | | | b0 |
|----|----|----|----|--|--|--|----|
| 0  |    |    |    |  |  |  |    |

INFORMATION | TYPE NUMBER

00 NORMAL         1-30 TYPE
01 ERROR
10 COMPOSITE      11111 EXTENSION.....00H 00H
11 URGENT

LENGTH

| b7 | b6 | b5 | | | | | b0 |
|----|----|----|--|--|--|--|----|
| 1  | 0  |    |  | L <= 63 | | | |

| b7 | b6 | b5 | | | | | b0 |
|----|----|----|--|--|--|--|----|
| 1  | 1  |    |  | 0 < K <= 63 | | | |

FOLLOWING K BYTES SPECIFY THE LENGTH

| b7 | b6 | b5 | | | | | b0 |
|----|----|----|--|--|--|--|----|
| 1  | 1  | 0  | 0 | 0 | 0 | 0 | 0 | ...00H 00H

INDEFINITE

*FIG. 3*

| ENGINE | DIAG. | DATA | COMMENT |
|---|---|---|---|
| 1 | →<br>← | 02, 81, 03 | IDENTIFYING DIAGNOSTIC SYSTEM |
| 2 | →<br>← | 01, 81, 02 | ACK IDENTITY |
| 3 | →<br>← | 06, 81, 01 | INQUIRY IDENTITY |
| 4 | →<br>← | 41, 86, 01, 81, 06, 07, 81, 01 | COMPOSITE ACK.  ACK INQUIRY & REPORT MODEL = 1 |
| 5 | →<br>← | 06, 81, 02 | INQUIRY MODEL |
| 6 | →<br>← | 41, 86, 01, 81, 06, 07, 81, 02 | COMPOSITE ACK.  ACK INQUIRY & REPORT MODEL = 2 |
| 7 | →<br>← | 09, 84, 00, 01, 00, 02 | PARAMETERS (1, 2) REPORT |
| 8 | →<br>← | 21, 81, 09 | COMMAND NOT UNDERSTOOD |
| 9 | →<br>← | 08, 84, 00, 00, 01, C1 | REPORT ADDRESS (01C1) CONTENT |
| 10 | →<br>← | 01, 81, 08 | ACK |
| 11 | →<br>← | 07, 87, 00, 00, 01, C1, 3D, FF | REPORT 01C1 = FF |
| 12 | →<br>← | 01, 81, 07 | ACK |

*FIG. 5*

UNITED STATES PATENT AND TRADEMARK OFFICE
CERTIFICATE OF CORRECTION

PATENT NO. : 5,412,779
DATED : May 2, 1995
INVENTOR(S) : Tetsuro Motoyama

It is certified that error appears in the above-identified patent and that said Letters Patent is hereby corrected as shown below:

```
Col. 1, line 8, change "07/759,278" to --07/549,278--.

Col. 3, line 27, after "Copier Engine" insert --10--.

Col. 5, line 5, after "identifying" insert --of the--;
after "diagnostic" insert --system--.

Col. 5, line 47, after "to communicate" insert --with--.

Col. 5, line 63, change "sent" to --send--.

Col. 5, line 66, change "stat" to --state--.

Col. 6, line 2, delete "or".

Col. 6, line 3, change "of" to --to--.
```

Signed and Sealed this

Twenty-eighth Day of November 1995

Attest:

BRUCE LEHMAN

*Attesting Officer*    *Commissioner of Patents and Trademarks*